Nov. 14, 1961  G. W. HUMPHREYS  3,009,102
APPARATUS FOR MEASURING INSULATOR RESISTANCES
Filed March 28, 1958  3 Sheets-Sheet 1

INVENTOR
G. W. HUMPHREYS
BY R. P. Miller
ATTORNEY

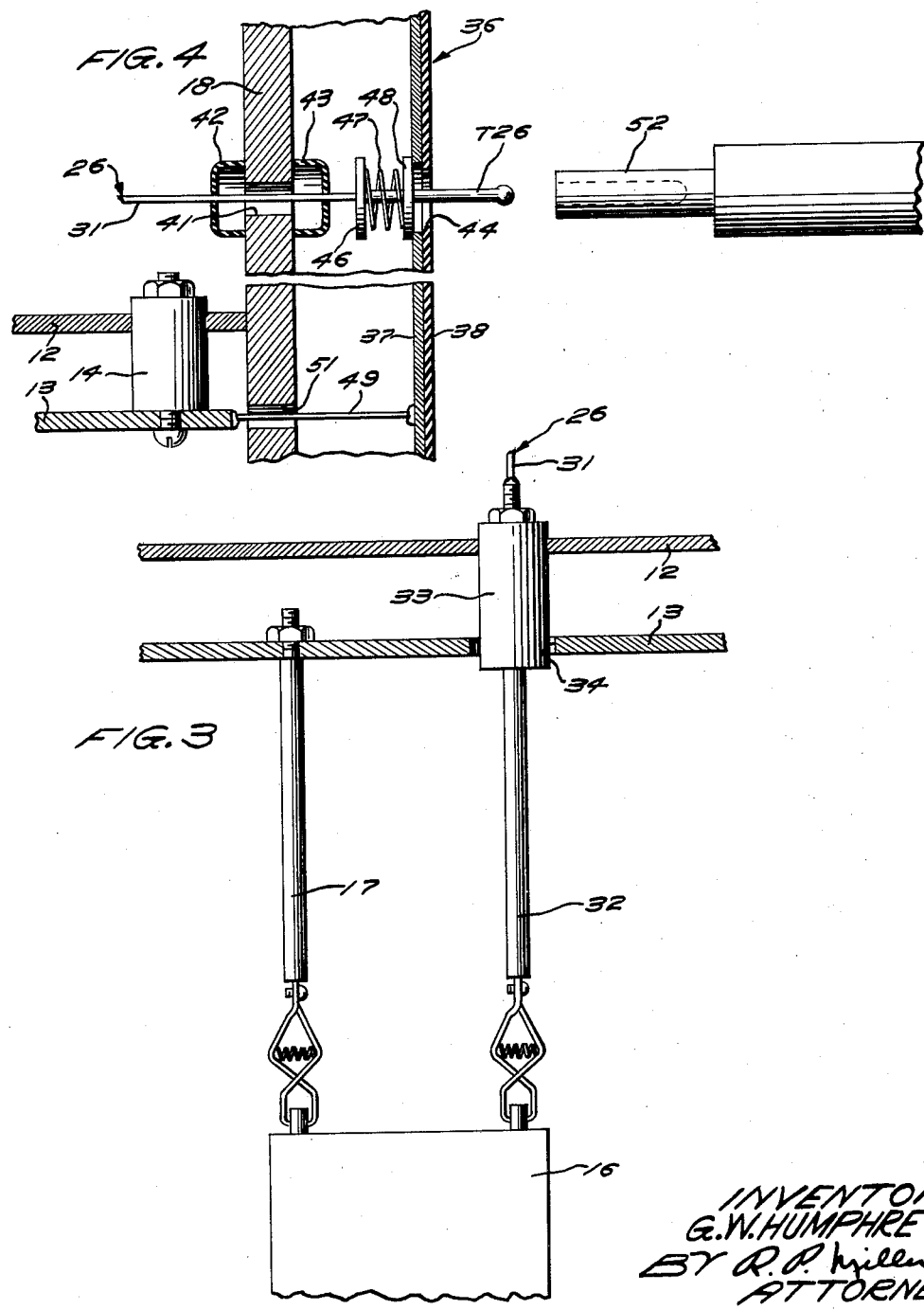

INVENTOR
G. W. HUMPHREYS
BY R. P. Miller
ATTORNEY

United States Patent Office 3,009,102
Patented Nov. 14, 1961

3,009,102
APPARATUS FOR MEASURING INSULATOR RESISTANCES
George W. Humphreys, Downers Grove, Ill., assignor to Western Electric Company, Incorporated, New York, N.Y., a corporation of New York
Filed Mar. 28, 1958, Ser. No. 724,647
5 Claims. (Cl. 324—62)

This invention relates to an apparatus for measuring resistances of electrical components, or more particularly to an apparatus for measuring resistances in which all leakage currents through the insulation of the apparatus can be controlled and measured.

In the measurement of resistances, a small amount of error will occur due to leakage currents through the insulation of the testing apparatus. Ordinarily, these currents are so small in magnitude that the error introduced thereby may be neglected as not having a pertinent effect on the resistance measurement. However, when a measurement is made of a resistor having a resistance value of the magnitude of thousands or millions of megohms, then the resistor under test begins to reach the resistance range of the insulators in the testing apparatus. When this situation exists, it becomes necessary to account for all of the leakage currents within the apparatus, because the percentage of error introduced thereby may become so great as to make the measurement of the resistor under test inaccurate.

It is therefore an object of this invention to provide a new and improved economical resistance measuring apparatus.

Another object of the invention is to provide an apparatus for selectively measuring the insulation resistance of a plurality of electrical components at various temperatures while the components are inside an oven.

A further object is to provide an apparatus for selectively measuring the resistance of a plurality of electrical components within an oven whereby the total insulation resistance of the oven and testing apparatus may be measured.

With these and other objects in view, the present invention contemplates an apparatus for measuring dielectric resistances of capacitors or insulation resistances of other materials. The capacitors are placed in an oven for the measuring of the dielectric resistances thereof at various temperatures. One lead of each capacitor is connected to one of a plurality of terminals projecting through a wall of the oven and the other lead of each capacitor is connected to a common plate, which in turn is connected to a test set. A plug, also connected to the test set, is selectively engageable with each terminal to allow the testing of each individual capacitor. The test set is capable of measuring: (1) the voltage placed across the test set, (2) the current through the dielectric of the capacitor under test and the leakage resistances of the apparatus, and (3) the current through the leakage resistances of the apparatus per se. From these measurements, the resistance of the dielectric material of the capacitor under test may be easily and precisely calculated.

Other objects, advantages and novel features of the invention will become apparent upon consideration of the following detailed description, in conjunction with the accompanying drawings wherein:

FIG. 3 is an enlarged sectional view taken along line 3—3 of FIG. 1 disclosing a portion of the electrical wiring within the oven;

Figure 2:
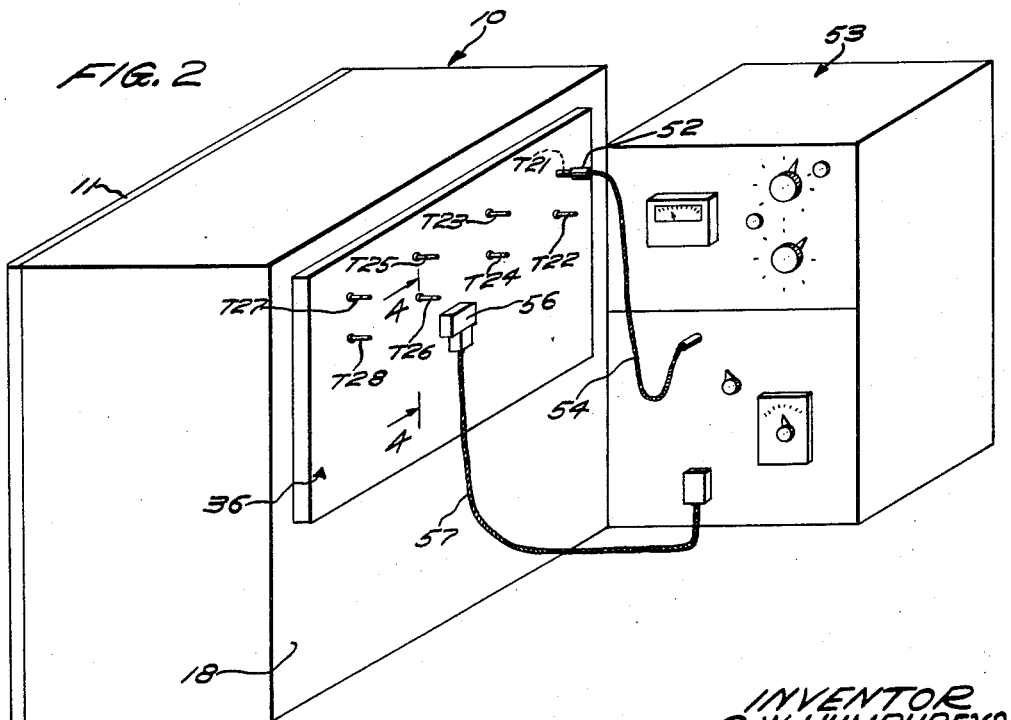
FIG. 2 is a perspective view showing the connections between an oven and a test set.
Figure 5:
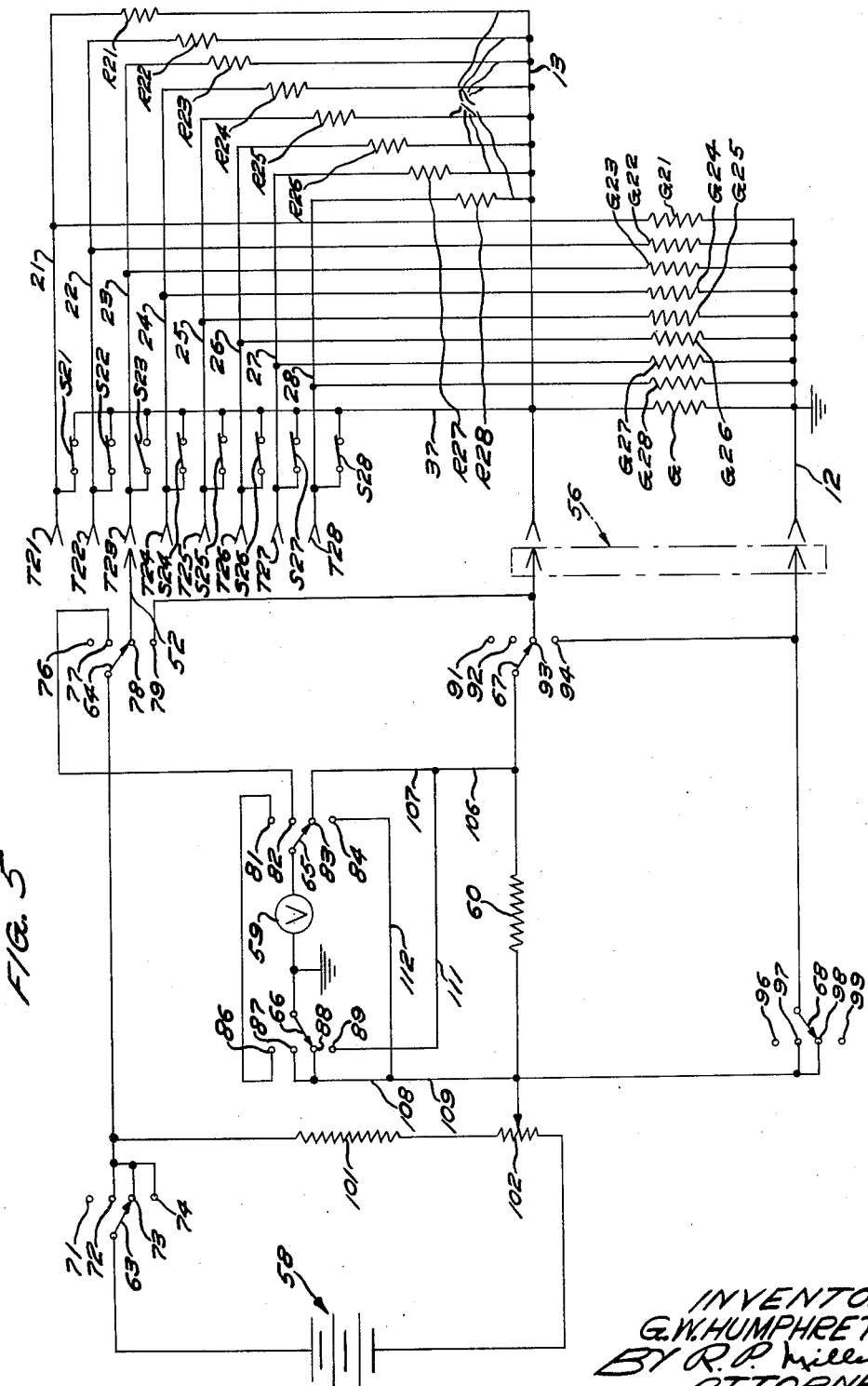

FIG. 4 is an enlarged cross-sectional view of the back wall of the oven taken along line 4—4 of FIG. 2 disclosing the manner in which the electrical connections from the components under test within the oven are extended through the wall of the oven; and FIG. 5 is a detailed electrical representation of the resistances and circuitry introduced by the oven and a specific type of electrical test set connectible thereto.

Attention is now directed to FIGS. 1 through 4 wherein an oven 10 is shown having a hinged front door 11 allowing access to the interior of the oven. The interior of the oven 10 is provided with a conductive guard plate 12 which is connected to the oven both physically and electrically. Connected to the guard plate 12 is a common conductor plate 13 which is slightly smaller than the guard plate and is isolated both physically and electrically from the oven 10 and is insulated from the guard plate 12 by a plurality of insulating spacers 14.

A plurality of electrical components, such as capacitors 16, are connected through one terminal of the capacitors to the common plate 13 by leads 17. The other terminals of the capacitors 16 are connected through the back wall 18 of the oven 10 by conductors 21 to 28. As shown in FIG. 3, each conductor 21 to 28 consists of an upper rigid wire portion 31 and a lower insulated flexible portion 32. The upper and lower portions 31 and 32 are connected by means of an insulator bushing 33 which is mounted in the guard plate 12 and extends through an aperture 34 in the common plate 13. The aperture 34 has a larger diameter than the diameter of the bushing 33 thereby more thoroughly isolating the conductor 26 from the common plate.

As disclosed in FIGS. 2 and 4, the back wall 18 is provided with a panel 36 which comprises a metallic sheet 37 and a cover 38 of any suitable insulating material. Each wire 31 of the conductors 21 to 28 extends through an aperture 41 formed in the back wall 18 and is supported by insulator cups 42 and 43 placed on either side of the back wall which serve to electrically insulate the wire 31 from the oven 10 and support the wire in spaced relationship from the oven wall. The wires 31 of the conductors 21 to 28 are connected to terminals T21 to T28 which project from the panel 36 through apertures 44 formed in the panel. Each terminal T21 to T28 is provided with a metallic disc 46 at the intersection of the conductors and terminals which supports a spring 47 for urging a washer 48 against the metallic sheet 37 of the panel 36. The washers 48 are slidably mounted around the terminals T21 to T28 and serve to electrically connect the conductors 21 to 28 to the metallic sheet 37 through the discs 46 and springs 47. The guard plate 12 and the walls of the oven are electrically connected together to form a conductive guard circuit and the metallic sheet 37 is connected to the common plate 13 by means of a strap 49 which projects through an aperture 51 in the back wall 18 of the oven to form a conductive common circuit.

When it is desired to test one of the capacitors 16 positioned within the oven 10, a plug or jack 52 is plugged into the back panel 36 by placing the plug over one of the terminals T21 to T28, for instance, terminal T26 (FIG. 4), and inserting the plug into the aperture 44 in the panel associated with the terminal. The front surface of the plug 52 engages the washer 48 and moves the washer against the force of the spring 47 to disconnect the conductor 26 from the metallic sheet 37. The plug 52 is connected by a cable 54 to a test set contained within cabinet 53. The guard circuit, that is the walls of the oven 10, and the guard plate 12, and the common circuit are connected to the test set through a plug 56 and a cable 57.

In the ordinary measurement of resistances having low resistive values, the precautions taken to insulate the current-carrying circuit of the component under test are sufficient to eliminate significant errors introduced by leakage currents, especially if the insulators 14, 33, 42 and 43 are constructed of a high resistance material such as Teflon. In the measurement of these low resistive components, some error is introduced into the measurement, but the amount of leakage current through the insulators is infinitesimal in comparison to the currents passing through the resistor under test and can be neglected. However, if the resistor under test has a resistance value near the range of the resistance of the insulators, then the currents through the insulators become large enough in comparison to the currents through the resistor under test that they must be taken into consideration if the measurement is to have sufficient accuracy. Such is the case if the resistance under test is an insulating material or, as given in the present example, high resistive dielectric material within capacitors.

FIG. 5 discloses a detailed circuit representation of the various resistances presented by the oven and one type of test set that may be used to measure these resistances. The test set is represented as that portion of the circuit to the left of plugs 52 and 56 and the oven is represented as that portion of the circuit to the right of the plugs. The plugs 52 and 56 represent, respectively, the connection from the test set to one of the terminals T21 to T28 through the cable 54 and the connections from the test set to the guard circuit 12 and common circuit 13 through the cable 57 as shown in FIG. 2.

The basic components of the test set comprise a D.C. source of potential such as a battery 58, a voltmeter 59 and a standard resistor 60. A gang switch having six, four-position switches 63 to 68 is used to connect the battery, voltmeter and standard resistor in various circuit configurations. The six switches, operating in unison, serve to: (1) turn the test set off, (2) measure the output of the battery 58, (3) measure the dielectric resistance of the capacitor under test in combination with the insulation resistance of the oven and (4) measure the insulation resistances of the oven per se.

Figure 1:
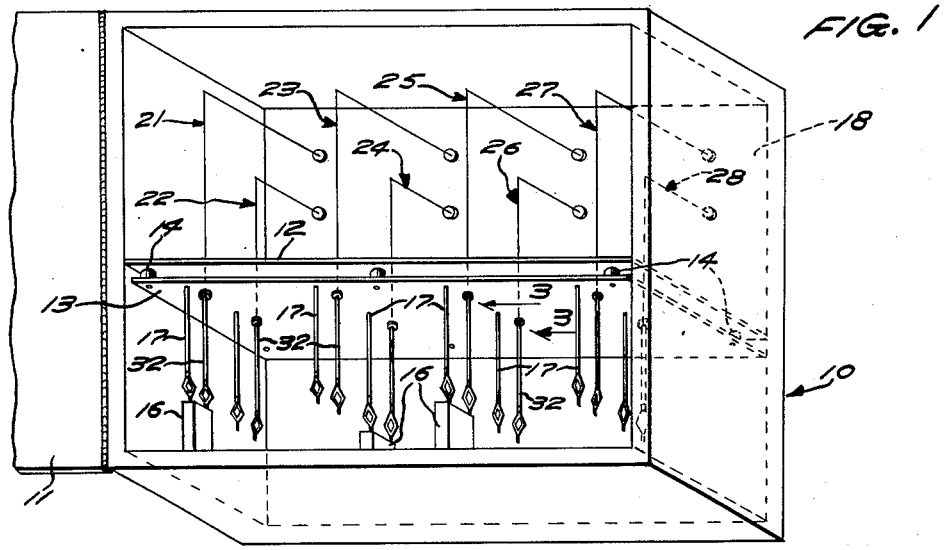
FIG. 1 is a front perspective view of an oven constructed, to retain a plurality of electrical components under test, in accordance with the principles of the invention.

Attention is now directed to the right-hand portions of FIG. 5 which discloses the electrical representation of the oven 10. The eight resistors R21 to R28 represent the resistances of the dielectric material of the capacitors 16 as shown in FIG. 1. It should be understood, however, that the apparatus may be constructed to test any desired number of resistors of any type of resistive material in lieu of the dielectric material of the capacitors. The upper portions of the resistors R21 to R28 are connected by conductors 21 to 28 to terminals T21 to T28, and conductors 17 connect the other sides of the resistors to the conductor 13. The resistors R21 to R28 are, therefore, connected in the same manner as the capacitors 16 in FIGS. 1–4 with the conductor 13 representing the common plate 13.

The washers 48 on the terminals T21 to T28 selectively connect the terminals to the metallic sheet 37 on the panel 36 which is connected to the common plate 13. This arrangement of washers is represented by switches S21 to S28 (washers 48 in FIGS. 4) operating to connect the terminals T21 to T28 to conductor 13 through the conductor 37, which represents the metallic sheet 37 on the panel 36.

When the plug 52 is placed over one of the terminals T21 to T28, for example, T23, and into the aperture 44 associated therewith, connection between switch S23 and the conductor 37 is broken and the main testing current flows from the test set through plug 52, terminal T23, conductor 23, resistor 23, conductor 17 and back to the test set through the conductor 13. The other resistors R21 to R28 are shorted out across conductor 13 through conductor 37 and normally closed switches S21 to S28 and the conductors 21 to 28.

Each of the main paths of testing current introduces several leakage current paths through which the testing current may also travel. These leakage paths will be from the conductor 21 to 28 connected to the plug 52, through insulators 33, 42 and 43 to the guard circuit. It may, therefore, be understood that each of the testing circuits through the resistors R21 to R28 will have leakage paths extending therefrom to the guard circuit, which is represented by conductor 12 in FIG. 5. It will also be noted that the leakage paths will have resistances equal to the value of the resistances of the insulators 33, 42 and 43. The resistances of the insulators are connected in parallel to each other and are represented in FIG. 5 by the resistances G21 to G28 connected between conductors 21 to 28 and conductor 12. An additional leakage path is provided between the common plate 13 and the guard plate 12 through the insulator spacers 14. This leakage path is common to all of the main testing current paths and is represented by the resistor G connected between conductors 12 and 13.

*Operation*

In the operation of the testing apparatus, the operator places the gang switch in the first position, thereby causing switches 63 to 68 to engage contacts 71, 76, 81, 86, 91 and 96, respectively. These contacts are open and, therefore, place the apparatus in the "off" position. The plug 52 is selectively placed over one of the terminals T21 to T28, for example, T23, thereby opening the switch S23. The plug 56 is then plugged into the oven 10 to connect the conductors 12 and 13 to the test set.

The second position of the gang switch connects the voltmeter 59 directly across a voltage divider comprising resistors 101 and 102 to measure the voltage output of the battery 58. The current path of the second position of the gang switch is from the positive side of the battery 58 through switch 63, contact 72, switch 64, contact 77, contact 82, switch 65, meter 59, switch 66, contact 87 through resistor 102 to the negative side of the battery 58. The meter 59, being thus connected, measures the voltage which will be applied from the test set to the resistances to be measured.

Position number three of the gang switch serves to measure the resistance of the capacitor under test in combination with the leakage resistances of the oven. The gang switch, being in the third position, completes a main testing current path from the positive side of battery 58 through switch 63, contact 73, switch 64, contact 78, plug 52 and terminal T23, conductor 23, resistance R23, conductors 17 and 13, plug 56, contact 93, switch 67, standard resistor 60 and to the negative side of battery 58 through adjustable resistor 102. The leakage paths, due to the insulators 33, 42 and 43, associated with the resistor R23 are represented by the resistor G23 and will be connected directly across the battery 58 from conductor 23 through the resistor G23, conductor 12, plug 56, switch 68, contact 98 and resistor 102.

It will be noted that the resistors G21, G22 and G24 to G28 and the resistor G will be connected in parallel with the standard resistor 60. The parallel connection of resistors G21, G22, and G24 to G28 will be completed from the right hand side of resistor 60 through switch 67, contact 93, plug 56, conductor 37, switches S21, S22 and S24 to S28, conductors 21, 22 and 24 to 28, resistors G21, G22 and G24 to G28, conductors 12, plug 56, switch 68, contact 98 to the left hand side of the resistor 60. As the resistor G is connected directly across the guard and common conductors 12 and 13, it will also be connected in parallel with resistor 60.

The meter 59 is connected across the standard resistor 60 through conductors 106 and 107, contact 83, switch 65, meter 59, switch 66, contact 88 and conductors 108 and 109. In this circuit connection, the resistance of R23 may be found in terms of resistor 60, the voltage across the resistor 60 as measured by meter 59, and the voltage applied to the circuit from battery 58, all of which are known, and in terms of the total insulator leakage resistance, comprising resistors G21, G22, G24 to G28 and G, which is yet unknown.

The fourth position of the gang switch is used to measure the total leakage resistance of the oven, comprising resistors G21, G22, G24 to G28 and G. This circuit may be traced from the positive side of the battery 58 through switch 63, contact 74, switch 64, contact 79, plug 56, conductor 37, normally closed switches S21, S22 and S24 to S28, conductors 21, 22 and 24 to 28, resistors G21, G22 and G24 to G28, plug 56, contact 94, switch 67, resistor 60 and to the negative side of the battery 58 through resistor 102. The resistance G is also connected in parallel to the resistances G21 to G28 by being connected directly across the two terminals of plug 56. The meter 59 is again connected directly across the standard resistor 60 through conductors 106 and 111, contact 89, switch 66, meter 59, switch 65, contact 84, and conductors 112 and 109. With this circuit connection, it may be noted that the total leakage resistance is connected in series with the standard resistor 60 and that the value of the total leakage resistance may be determined from the voltage output of the battery 58, the known resistor 60 and the voltage across the resistor 60.

It may be understood from the preceding discussion that the leakage resistor G23 representing the leakage resistance associated with the capacitor under test will be connected directly across the battery 58 and, therefore, will not affect the measurement made by the meter 59 and standard resistor 60. The current passing through the resistor G23 does not flow through either the resistor under test, R23, or the standard resistor 60. However, the remaining leakage resistances of the oven will be connected in parallel with the standard resistor 60 and a portion of the current flowing through the resistor R23 under test will flow through the leakage resistors instead of the standard resistor 60 and thereby introduce error into the measurement. If therefore follows, that if the total leakage resistance is not excessively greater than the standard resistor 60, then the leakage resistance must be taken into consideration in the measurement of R23. As the test set is capable of measuring the leakage resistances of the oven, this measurement may be used to compensate for the error introduced by the leakage resistances and an exact value of the resistor under test may be obtained.

If it is found that the total leakage resistance is sufficiently greater than the standard resistor 60 that the error introduced thereby is negligible, then it may be understood that the measurement of the resistor under test may be determined directly from the measurement obtained when the gang switch in the third position in that the leakage resistance need not be considered in the measurement. Assuming this to be the case, then the fourth position of the gang switch may be used as a check to insure that none of the insulators in the oven has broken down, shorted out or is otherwise of a low resistive value which would cause large errors in the measurement of the resistances under test.

Although the preceding discussion was concerned with the controlling of leakage currents within the oven 10, it is to be understood that the connection of leakage circuits within the test set may be likewise placed either directly across the battery 58 or in parallel with the standard resistor 60 in order to control and measure all possible leakage currents within the apparatus. This additional discussion of the leakage circuits within the test set has been eliminated to prevent undue repetition.

It is to be understood that the above-identified operation, arrangement of apparatus and construction of elemental parts are simply illustrative of the application of the principles of this invention and many other modifications may be made thereto without departing from the scope and the spirit of the invention.

What is claimed is:

1. In an apparatus for measuring resistances of articles, a test set having a metering device for measuring resistances, a battery for supplying a fixed potential to the test set, enclosure means for supporting articles to be measured, a plurality of terminals extending through one side of the enclosure means, individual circuits for connecting one side of each article to a terminal, each of said individual circuits having first members for electrically insulating the circuits from one another and from the enclosure means, a common circuit extending through a wall of the enclosure means for connecting the other side of each article to the test set, said common circuit having second members for insulating the common circuit from the individual circuits and from the enclosure means, a plug connected to the test set for selectively engaging each terminal to connect the article associated therewith to the test set, normally closed switch means on each terminal for connecting each of the first insulating members in parallel with the second insulating members while in the closed position and connecting the first insulating members associated with the terminal directly across the battery while in the open position, said switch means being opened upon engagement between the terminal associated therewith and the plug, and sequentially operative means within the test set for connecting the metering device in series with the article under test and in parallel with the first and second insulating members and subsequently connecting the metering device in series with the first and second insulating members.

2. Apparatus for measuring the resistance of a high resistance article in cooperation with an electric power source, comprising current measuring means having one terminal thereof connected to one terminal of said power source, a first conductor for connection to one point on said article, a second conductor for connection to another point on said article, a third conductor connected to an intermediate point along the leakage resistance path between said first and second conductors, and switch means having a first position and a second position, said switch means when in said first position connecting said first conductor to the other terminal of said power source, and said second conductor to the other terminal of said current measuring means, whereby the resistance of said article may be tested, said switch means when in said first position also connecting said third conductor to said one terminal of said power source, whereby leakage current tending to flow between said first and second conductors is caused to bypass said current measuring means, said switch means when in said second position connecting said other terminals of said current measuring means and said power source to said second and third conductors to permit measuring of the leakage resistance between said second and third conductors.

3. Measuring apparatus as specified in claim 2 wherein an electrically conducting housing is provided for housing and supporting said article, said housing being at an intermediate point along the leakage resistance between said first and second conductors and having said third conductor connected thereto.

4. Measuring apparatus as specified in claim 3 wherein said first and second conductors extend through openings in said housing, and are supported on said housing through insulators whereby said conductors may support said article.

5. Apparatus for successively measuring the resistance of high resistance articles in cooperation with an electric power source, comprising current measuring means having one terminal connected to one terminal of said power source, a conductor for connection to one point on successive ones of said articles, another conductor for simultaneous connection to another point on each of said articles, a third conductor connected to an intermediate point along the leakage resistance path between said first and second conductors, and switch means having a first position and a second position, said switch means when in said first position connecting a first one of the two first-mentioned conductors to the other terminal of said power source, and a second one of the two first-mentioned conductors to the other terminal of said current measuring means, whereby the resistance of successive ones of said articles may be tested, said switch means when in said first position also connecting said third conductor to said one terminal of said power source, whereby leakage current tending to flow between said first and second conductors is caused to bypass said current measuring means, said switch means when in said second position connecting said other terminals of said current measuring means and said power source to said second and third conductors to permit measuring of the leakage resistance between said second and third conductors.

References Cited in the file of this patent

UNITED STATES PATENTS 2,749,513     Lake  ------------------ June 5, 1956